United States Patent [19]
Fukuma

[11] Patent Number: 6,000,385
[45] Date of Patent: Dec. 14, 1999

[54] COMBUSTION ENGINE WITH EGR APPARATUS

[75] Inventor: Takao Fukuma, Numazu, Japan

[73] Assignee: Toyota Jidosha Kabushiki Kaisha, Aichi, Japan

[21] Appl. No.: 08/999,634

[22] Filed: Oct. 31, 1997

[30] Foreign Application Priority Data

Nov. 14, 1996 [JP] Japan ................................. 8-303149

[51] Int. Cl.$^6$ ........................... F02M 25/07; F02D 41/14
[52] U.S. Cl. ...................................... 123/704; 123/568.16
[58] Field of Search ............................... 123/704, 568.16

[56] References Cited

U.S. PATENT DOCUMENTS

| | | | |
|---|---|---|---|
| 4,168,683 | 9/1979 | Hata et al. ................................. | 123/704 |
| 4,614,175 | 9/1986 | Asayama ................................... | 123/704 |
| 4,727,849 | 3/1988 | Nishida et al. ........................... | 123/704 |
| 4,794,903 | 1/1989 | Suzuki ..................................... | 123/704 |
| 5,201,303 | 4/1993 | Kojima ..................................... | 123/704 |

FOREIGN PATENT DOCUMENTS

| | | |
|---|---|---|
| 0351960 | 1/1990 | European Pat. Off. . |
| 57-148048 | 9/1982 | Japan . |
| 60-138263 | 7/1985 | Japan . |

OTHER PUBLICATIONS

M. Nishida, et al., "Closed Loop Control of the EGR Rate Using the Oxygen Sensor", SAE International Congress and Exposition, No. 880133, Feb. 29, 1988–Mar. 4, 1988, pp. 6, 168–6, 170, XP002105012, p. 6, 172, col. 2, line 8, p. 6, 171, col. 2, line 52, p. 6, 173, col. 2, line 12–line 26.

*Primary Examiner*—Willis R. Wolfe
*Attorney, Agent, or Firm*—Kenyon & Kenyon

[57] ABSTRACT

A combustion engine with an EGR apparatus has an EGR path connecting an exhaust path and an intake path. An EGR control valve is mounted in the EGR path for controlling the amount of flow of an EGR gas flowing from the exhaust path to the intake path. The combustion engine also has an oxygen concentration sensor mounted downstream of a joint of the intake path and the EGR path, and in the intake path, for detecting a concentration of oxygen in an intake air. The intake air contains the EGR gas and an air introduced from an atmosphere via the intake path. The combustion engine also has converted actual EGR ratio calculating means for calculating a converted actual EGR ratio on the basis of the concentration of oxygen in the intake air detected by the sensor. The converted actual EGR ratio is a ratio of an actual EGR ratio to an actual air ratio. The actual EGR ratio is a ratio of the amount of the EGR gas to the amount of the intake air.

10 Claims, 8 Drawing Sheets

R ··· TARGET EGR RATIO
$R_1 > R_2 > R_3 > R_4$

Fig.5

| NUMBER OF TIMES OF RECIRCULATION | AMOUNT OF INTAKE AIR PER UNIT FUEL ($Nm^3/kg$) | AMOUNT OF EXHAUST GAS PER UNIT FUEL ($Nm^3/kg$) |
|---|---|---|
| 0 | $\lambda L_0$ | COMBUSTION → $(\lambda-a)L_0+b$ |
| 1 | $\lambda L_0 + R\{(\lambda-a)L_0+b\}$ | RECIRCULATION ↘ $(1+R)\{(\lambda-a)L_0+b\}$ |
| 2 | $\lambda L_0 + R(1+R)\{(\lambda-a)L_0+b\}$ | ↘ $(1+R+R^2)\{(\lambda-a)L_0+b\}$ |
| ... | ... | ... |
| n | $\lambda L_0 + R(1+R+\cdots+R^{n-1})\{(\lambda-a)L_0+b\}$ | ↘ $(1+R+\cdots+R^n)\{(\lambda-a)L_0+b\}$ |
| STEADY CONDITION | $\lambda L_0 + \{R/(1-R)\}\{(\lambda-a)L_0+b\}$ | $\{1/(1-R)\}\{(\lambda-a)L_0+b\}$ |

$\lambda$ ... AIR RATIO
$L_0$ ... THEORETICAL AMOUNT OF AIR PER UNIT FUEL ($Nm^3/kg$)
$R$ ... EGR RATIO
$a$ ... CONCENTRATION OF OXYGEN IN ATMOSPHERE
$b$ ... PRODUCTION OF $CO_2$ AND $H_2O$ PER UNIT FUEL ($Nm^3/kg$)

Fig.6

| NUMBER OF TIMES OF RECIRCULATION | AMOUNT OF OXYGEN IN INTAKE AIR PER UNIT FUEL (Nm³/kg) | AMOUNT OF OXYGEN IN EXHAUST GAS PER UNIT FUEL (Nm³/kg) |
|---|---|---|
| 0 | $a\lambda L_0$ | COMBUSTION $\rightarrow$ $a(\lambda-1)L_0$ |
| 1 | $a\lambda L_0 + Ra(\lambda-1)L_0$ | $(1+R)a(\lambda-1)L_0$ |
| 2 | $a\lambda L_0 + R(1+R)a(\lambda-1)L_0$ | $(1+R+R^2)a(\lambda-1)L_0$ |
| ... | ... | ... |
| n | $a\lambda L_0 + R(1+R+\cdots+R^{n-1})a(\lambda-1)L_0$ | $(1+R+\cdots+R^n)a(\lambda-1)L_0$ |
| STEADY CONDITION | $a\lambda L_0 + \{R/(1-R)\}a(\lambda-1)L_0$ | $\{1/(1-R)\}a(\lambda-1)L_0$ |

$\lambda$ ... AIR RATIO
$L_0$ ... THEORETICAL AMOUNT OF AIR PER UNIT FUEL (Nm³/kg)
$R$ ... EGR RATIO
$a$ ... CONCENTRATION OF OXYGEN IN ATMOSPHERE
$b$ ... PRODUCTION OF $CO_2$ AND $H_2O$ PER UNIT FUEL (Nm³/kg)

Fig.7

- $R$ ··· EGR RATIO
- $\lambda$ ··· AIR RATIO
- $R/\lambda$ ··· CONVERTED ACTUAL EGR RATIO
- $x$ ··· CONCENTRATION OF OXYGEN IN INTAKE AIR
- $L_0$ ··· THEORETICAL AMOUNT OF AIR PER UNIT FUEL ($Nm^3/kg$)
- $a$ ··· CONCENTRATION OF OXYGEN IN ATMOSPHERE
- $b$ ··· PRODUCTION OF $CO_2$ AND $H_2O$ PER UNIT FUEL ($Nm^3/kg$)
- $p, q$ ··· CONSTANT

Fig.8

$R/\lambda$ ··· CONVERTED TARGET EGR RATIO $$(R/\lambda)_1 > (R/\lambda)_2 > (R/\lambda)_3 > (R/\lambda)_4$$

COMBUSTION ENGINE WITH EGR APPARATUS

BACKGROUND OF THE INVENTION

1. Field of the Invention

The present invention relates to a combustion engine with an EGR apparatus and particularly relates to a combustion engine with an EGR apparatus having an oxygen concentration sensor mounted in an intake path.

2. Description of the Related Art

As is known in the prior art, an EGR (exhaust gas recirculation) apparatus recirculates a part of an exhaust gas of the combustion engine for controlling the combustion in the combustion engine. An EGR control valve is mounted in an EGR path which recirculates the part of the exhaust gas to the intake path. The opening of the EGR control valve is controlled on the basis of the amount of an EGR gas recirculated to the intake path. Japanese Unexamined Patent Publication (Kokai) No. 57-148048 discloses a method for calculating the amount of EGR gas wherein an air flow meter for detecting the amount of an air introduced from an atmosphere and a pressure detector for detecting the amount of an intake air containing an EGR gas and the air introduced from the atmosphere, are mounted in the intake path, and the amount of EGR gas is calculated on the basis of the amount of the intake air and the amount of the air introduced from the atmosphere.

In order to correctly detect the amount of the intake air drawn into the combustion engine, the detected amount of the intake air must be compensated on the basis of the temperature of the intake air and the temperature of the air introduced from the atmosphere. However, when the temperature of the intake air and the temperature of the air introduced from the atmosphere are detected by temperature sensors, it is difficult to correctly detect the temperatures at each moment because the temperature sensors have relatively large time constants. During the transitional operational condition of the combustion engine wherein the change of the temperature is relatively large, the temperature detected by the temperature sensor greatly differs from the actual temperature, therefore, it is difficult to correctly detect the amount of the EGR gas. If the amount of the EGR gas is not correctly detected, the proper combustion is not achieved in the combustion engine and the amount of NOx and smoke in the exhaust gas increases.

Further, when a plurality of sensors such as the air flow meter, the pressure sensor and the temperature sensor are used, the errors of the values detected by respective sensors accumulate and, therefore, the errors of the amount of the intake air and the air introduced from the atmosphere accumulate, the amount of the intake air and the air introduced from the atmosphere being calculated on the basis of the values detected by respective sensors. Further, when a plurality of sensors are used, the complexity of a control system of the EGR apparatus increases, therefore, the cost of the EGR apparatus increases.

When a quick-response temperature sensor whose time constant is relatively small is used, it is possible to detect the temperature which is relatively close to the actual temperature, by means of the quick-response temperature sensor during the transitional operational condition of the combustion engine. However, since the quick-response temperature sensor is expensive, the cost of the EGR apparatus increases.

As is well known, in order to judge the EGR apparatus to be correct or wrong, i.e., in order to judge the failure of the EGR apparatus, an EGR ratio is used, the EGR ratio being a ratio of the amount of the EGR gas to the amount of the intake air. However, when the amount of the EGR gas in not correctly detected, the EGR ratio on the basis of the amount of the EGR gas is also incorrect, therefore, it is impossible to correctly judge the failure of the EGR apparatus.

SUMMARY OF THE INVENTION

An object of the present invention is to provide a combustion engine with an EGR apparatus which achieves combustion wherein the amount of NOx and smoke in an exhaust gas is small.

An another object of the present invention is to provide a combustion engine with an EGR apparatus which has only a few sensors to achieve combustion wherein the amount of NOx and smoke in an exhaust gas is small, the cost of which is relatively small, and which can detect or calculate an EGR ratio and the amount of an EGR gas.

A further object of the present invention is to provide a combustion engine with an EGR apparatus which further can judge the failure of the EGR apparatus.

The present invention provides a combustion engine with an EGR apparatus having an EGR path connecting an exhaust path and an intake path, an EGR control valve mounted in the EGR path for controlling the amount of flow of an EGR gas flowing from the exhaust path to the intake path, and a joint between the intake path and the EGR path, the combustion engine comprising:

detecting means mounted downstream of the joint and in the intake path, for detecting a concentration of oxygen in an intake air, the intake air containing the EGR gas and an air introduced from an atmosphere via the intake path; and converted actual EGR ratio calculating means for calculating a converted actual EGR ratio on the basis of the concentration of oxygen in the intake air detected by the detecting means, the converted actual EGR ratio being a ratio of an actual EGR ratio to an actual air ratio, the actual EGR ratio being a ratio of the amount of the EGR gas to the amount of the intake air.

Preferably, the converted actual EGR ratio calculating means calculates the converted actual EGR ratio on the basis of an equation of state and the concentration of oxygen in the intake air detected by the detecting means, the equation of state being on the basis of the state of the intake air containing the EGR gas.

Preferably, the converted actual EGR ratio calculating means calculate the converted actual EGR ratio on the basis of the following formula:

$$(R/\lambda) = ((a-x)L_0)/(aL_0 + (b-aL_0)x);$$

$R/\lambda$: the converted actual EGR ratio;

a: a concentration of oxygen in the atmosphere;

x: the concentration of oxygen in the intake air;

$L_0$: theoretical amount of air required for the combustion of an unit fuel; and b: a production of $CO_2$ and $H_2O$ produced during the combustion of the unit fuel.

Preferably, the converted actual EGR ratio calculating means calculate the converted actual EGR ratio on the basis of the concentration of oxygen in the intake air detected by the detecting means, and the converted actual EGR ratio decreases when the concentration of oxygen in the intake air increases.

The combustion engine with the EGR apparatus of the present invention has detecting means for detecting the concentration of oxygen in the intake air, the time constant of the detecting means being smaller than the time constant of a temperature sensor, and converted actual EGR ratio calculating means for calculating the converted actual EGR ratio on the basis of the concentration of oxygen in the intake air. Therefore, the combustion engine with the EGR apparatus can responsively calculate the converted actual EGR ratio even during the transitional operational condition of the combustion engine. Further, the combustion engine with the EGR apparatus has only the detecting means for detecting the concentration of oxygen in the intake air, as detecting means for calculating the converted actual EGR ratio. Therefore, an error in the detected values according to the combustion engine with the EGR apparatus of the present invention increases less than the error of the detected values according to the combustion engine with the EGR apparatus which has a plurality of detecting means. This means that the combustion engine with the EGR apparatus of the present invention can recognize the combustion condition of the combustion engine, i.e., the converted actual EGR ratio, and therefore, can be operated in the desired combustion condition.

Preferably, the combustion engine further comprises operational condition detecting means for detecting an operational condition of the combustion engine, target EGR ratio calculating means for calculating a target EGR ratio corresponding to the operational condition detected by the operational condition detecting means, actual air ratio detecting means for detecting an actual air ratio of the combustion engine, actual EGR ratio calculating means for calculating an actual EGR ratio of the combustion engine on the basis of the converted actual EGR ratio and the actual air ratio, and EGR ratio controlling means for controlling the divergence of the EGR control valve mounted in the EGR path, to put the actual EGR ratio close to the target EGR ratio.

The combustion engine calculates the actual EGR ratio on the basis of the calculated, converted actual EGR ratio and the detected actual air ratio, and controls the divergence of the EGR control valve in order to put the actual EGR ratio close to the target EGR ratio corresponding to the operational condition of the combustion engine. Therefore, the divergence of the EGR control valve can be controlled to the required divergence.

Preferably, the combustion engine further comprises an EGR ratio difference calculating means for calculating a difference between the actual EGR ratio and the target EGR ratio, and failure judging means for judging the EGR apparatus to have failed when the difference is larger than a failure criterion value.

The combustion engine calculates the difference between the actual EGR ratio and the target EGR ratio, and judges the EGR apparatus to have failed when the difference is larger than the failure criterion value, therefore, can correctly judge the EGR apparatus to have failed.

Preferably, the EGR ratio controlling means practice feedback control of the divergence of the EGR control valve on the basis of the actual EGR ratio and the target EGR ratio, to put the actual EGR ratio close to the target EGR ratio, therefore, the divergence of the EGR control valve can be controlled to the required divergence while the combustion engine is operated.

Preferably, the combustion engine further comprises operational condition detecting means for detecting an operational condition of the combustion engine, converted target EGR ratio calculating means for calculating a converted target EGR ratio corresponding to the operational condition detected by the operational condition detecting means, the converted target EGR ratio being a ratio of a target EGR ratio to an actual air ratio, and converted EGR ratio controlling means for controlling the divergence of the EGR control valve mounted in the EGR path, to put the converted actual EGR ratio close to the converted target EGR ratio.

The combustion engine controls the divergence of the EGR control valve in order to put the converted actual EGR ratio close to the converted target EGR ratio corresponding to the operational condition of the combustion engine, therefore, the divergence of the EGR control valve can be controlled to the required divergence.

Preferably, the combustion engine further comprises a converted EGR ratio difference calculating means for calculating a difference between the converted actual EGR ratio and the converted target EGR ratio, and failure judging means for judging the EGR apparatus to have failed when the difference is larger than a failure criterion value.

The combustion engine calculates the difference between the converted actual EGR ratio and the converted target EGR ratio, and judges the EGR apparatus to have failed when the difference is larger than the failure criterion value, therefore, can correctly judge the EGR apparatus to have the failure.

Preferably, the converted EGR ratio controlling means practice a feedback control of the divergence of the EGR control valve on the basis of the converted actual EGR ratio and the converted target EGR ratio, to put the converted actual EGR ratio close to the converted target EGR ratio, therefore, the divergence of the EGR control valve can be controlled to the required divergence while the combustion engine is operated.

BRIEF DESCRIPTION OF THE DRAWINGS

The above and other objects, features and advantages of the present invention will be made more apparent from the following description of the preferred embodiments thereof in conjunction with the accompanying drawings wherein.

DESCRIPTION OF THE PREFERRED EMBODIMENTS

Figure 1:
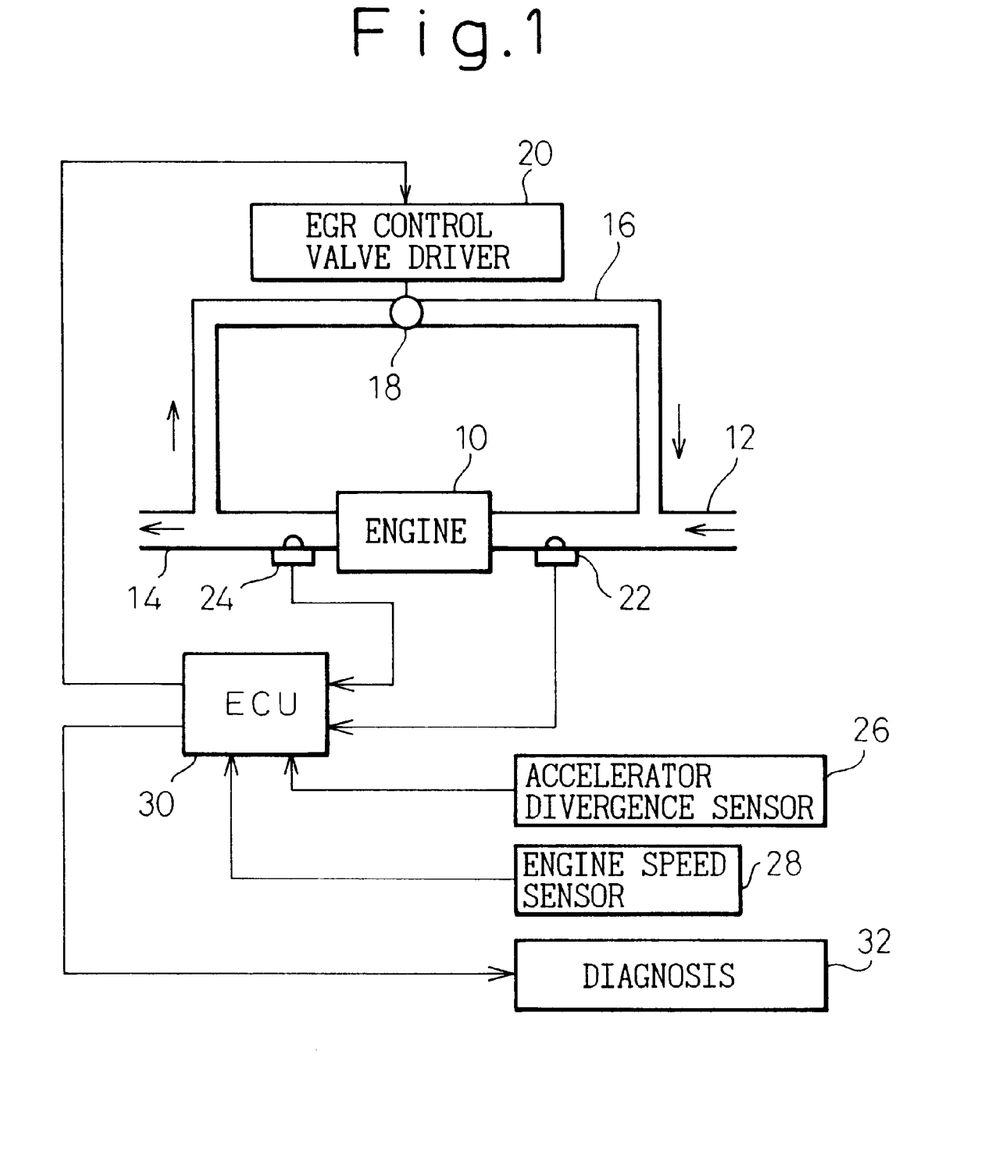
FIG. 1 is a diagrammatic view of a first embodiment of the combustion engine with the EGR apparatus according to the present invention.

FIG. 1 shows a diagrammatic view of a first embodiment of a combustion engine with an EGR apparatus according to the present invention. As shown in FIG. 1, the EGR apparatus has an EGR path 16 connecting a surge tank (not shown) of an intake path 12 to an exhaust path 14, with an EGR control valve mounted in the EGR path 16, to recirculate a part of an exhaust gas from a diesel engine 10 to the surge tank. An EGR control valve driver 20 is an EGR actuator such as an actuator actuated by negative pressure or a stepping motor, for driving an EGR control valve 18. As explained below, an ECU 30 of the engine 10 drives the EGR control valve driver 20 on the basis of operational condition of the engine 10 such as the amount of fuel injection and an engine speed, to control the divergence of the EGR control valve 18. Therefore, the amount of an EGR gas recirculated from the exhaust path 14 via the EGR path 16 to the intake path 12 is controlled.

The ECU 30 of the engine 10 is a well known digital computer connecting a ROM, a RAM, a CPU (microprocessor), an input port and an output port by means of a two way bus. The ECU controls the divergence of the EGR control valve 18 and indicates a failure caution by means of a diagnosis 32 as well as practices basic controls such as a fuel injection control.

In order to practice the above controls, a voltage signal corresponding to an accelerator divergence (the amount of displacement of an accelerator pedal) detected by an accelerator divergence sensor 26 mounted near the accelerator pedal, a voltage signal corresponding to a concentration of oxygen in the intake path detected by an oxygen concentration sensor 22 mounted in the intake path 12, and a voltage signal corresponding to a concentration of oxygen in the exhaust path detected by an oxygen concentration sensor 24 mounted in the exhaust path 14, are respectively received by means of the input port of the ECU 30 via an AD convertor containing a multiplexer. Each analogue voltage signal from each sensor is converted to a digital signal at intervals by means of the ECU 30, and is stored in the RAM of the ECU 30. Further, a pulse signal showing the engine speed and sent from an engine speed sensor 28 which is mounted on a crank shaft (not shown) of the engine 10, is received at intervals by means of the input port of the ECU 30. The engine speed is calculated by the CPU on the basis of the pulse signal, and is stored in the RAM of the ECU 30. Data corresponding to the concentration of oxygen in the intake path, the concentration of oxygen in the exhaust path, the accelerator divergence and the engine speed, and stored in the RAM are renewed at intervals, therefore, the RAM always has the latest data.

The output port of the ECU 30 is connected to the EGR control valve driver 20 of the EGR control valve 18 via a drive circuit (not shown), for controlling the divergence of the EGR control valve 18. Further, the output port of the ECU 30 is connected to the diagnosis 32, for diagnosing the failure of the EGR apparatus.

Figure 2:
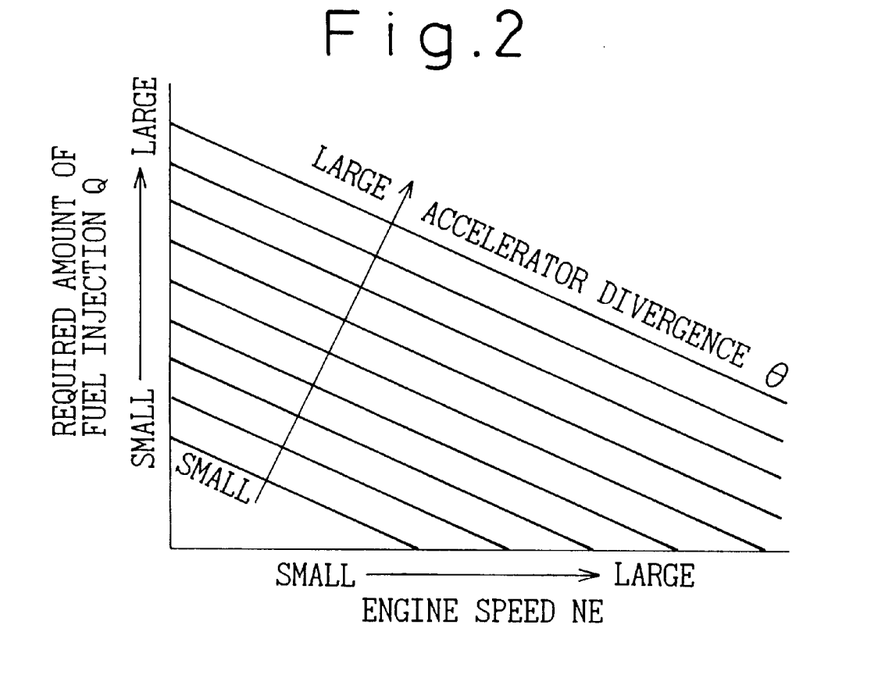
FIG. 2 is a map for calculating the required amount of fuel injection on the basis of the accelerator divergence and the engine speed.

In this embodiment, the required amount of fuel injection Q is calculated on the basis of the accelerator divergence θ and the engine speed NE. FIG. 2 shows a map for calculating the required amount of fuel injection Q on the basis of the accelerator divergence θ and the engine speed NE. In FIG. 2, a vertical axis shows the required amount of fuel injection Q, a cross axis shows the engine speed NE, and each line in FIG. 2 shows the required amount of fuel injection Q while the accelerator divergence θ is constant. As shown in FIG. 2, the required amount of fuel injection Q increases when the accelerator divergence θ increases while the engine speed NE is constant. The required amount of fuel injection Q increases when the engine speed NE decreases while the accelerator divergence θ is constant. Each value of the required amount of fuel injection Q in FIG. 2 is stored in the ROM of the ECU 30 in the form of a numerical map on the basis of the engine speed NE and the accelerator divergence θ. The ECU 30 calculates the required amount of fuel injection Q on the basis of the detected engine speed NE, the detected accelerator divergence θ and the numerical map according to FIG. 2.

Figure 3:
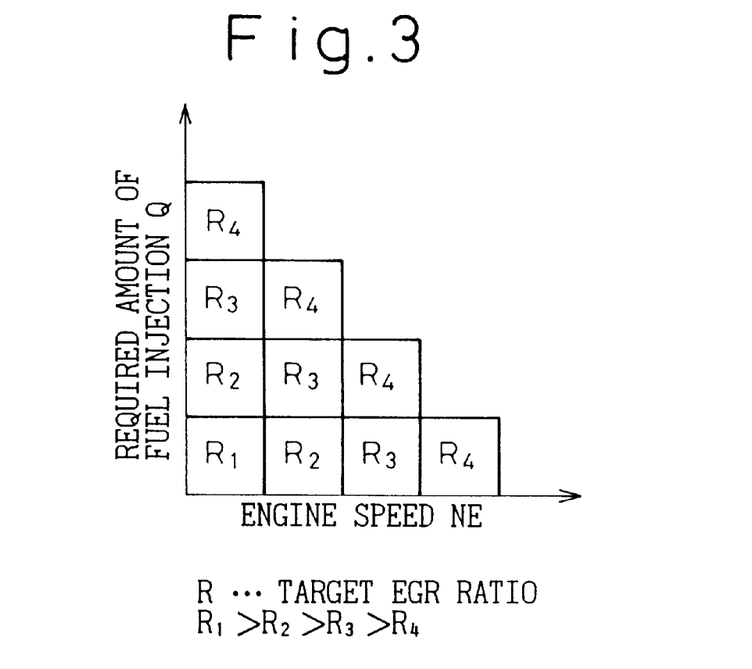
FIG. 3 is a map for calculating the target EGR ratio on the basis of the engine speed and the required amount of fuel injection.

A target EGR ratio is then calculated on the basis of the required amount of fuel injection Q and the engine speed NE. FIG. 3 shows a map for calculating the target EGR ratio on the basis of the engine speed NE and the required amount of fuel injection Q. In FIG. 3, a vertical axis shows the required amount of fuel injection Q, a cross axis shows the engine speed NE, each value of $R_1$, $R_2$, $R_3$ and $R_4$ shows a predetermined target EGR ratio wherein $R_1$ is larger than $R_2$, $R_2$ is larger than $R_3$, and $R_3$ is larger than $R_4$. Each value of the target EGR ratio in FIG. 3 is stored in the ROM of the ECU 30 in the form of a numerical map on the basis of the required amount of fuel injection θ and the engine speed NE. The ECU 30 calculates the target EGR ratio on the basis of the detected required amount of fuel injection θ, the detected engine speed NE and the numerical map according to FIG. 3.

Figure 4:
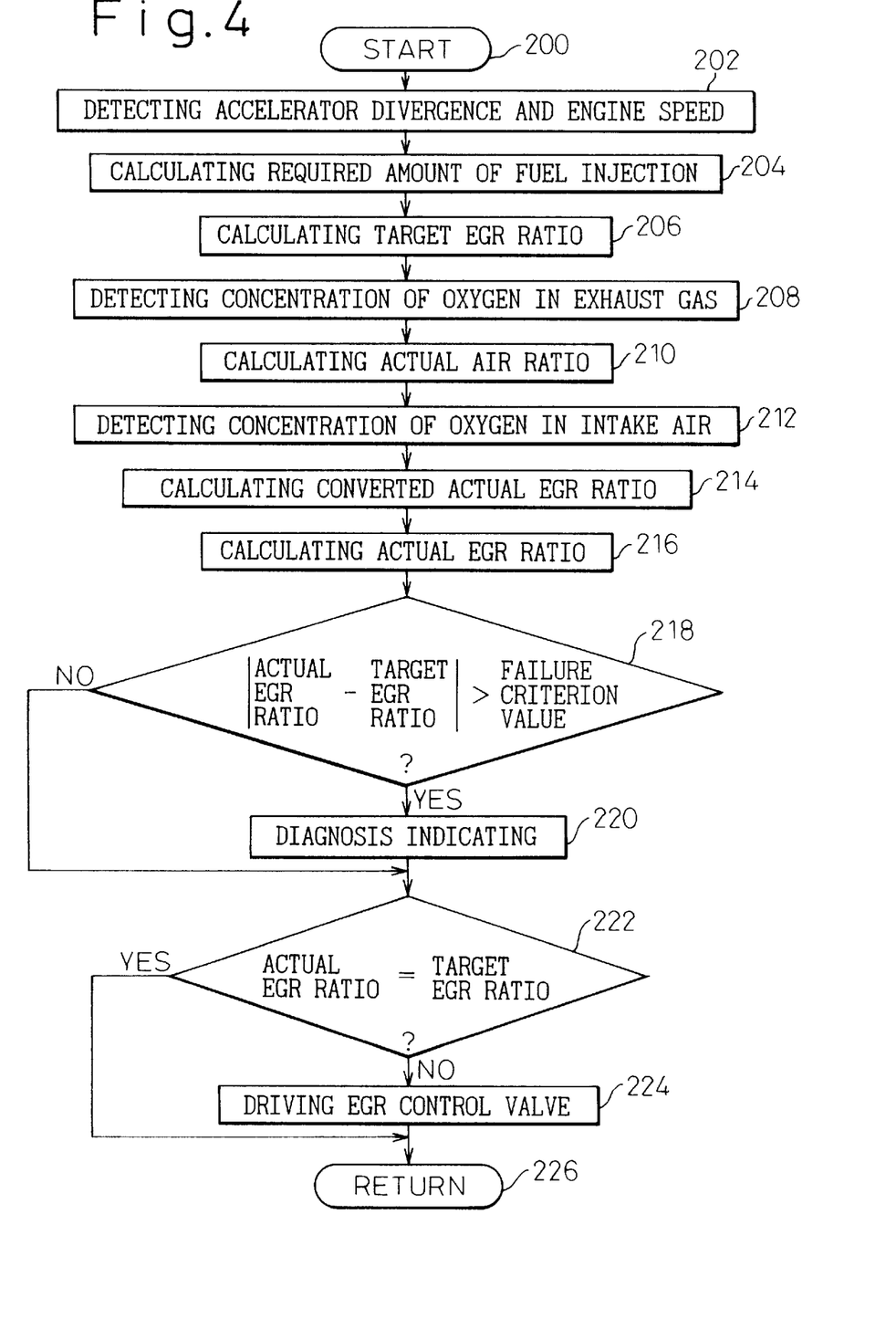
FIG. 4 is a control flow chart for the EGR apparatus of the first embodiment of the combustion engine with the EGR apparatus according to the present invention.

FIG. 4 shows a control flow chart for the EGR apparatus of the first embodiment of the combustion engine with the EGR apparatus according to the present invention. As shown in FIG. 4, after a control of the EGR apparatus is started in step 200, the accelerator divergence θ and the engine speed NE are detected by the accelerator divergence sensor 26 and the engine speed sensor 28 shown in FIG. 1, in step 202. Then, the required amount of fuel injection Q is calculated on the basis of the detected accelerator divergence θ, the detected engine speed NE and the numerical map according to FIG. 2, in step 204. Then, the target EGR ratio is calculated on the basis of the detected required amount of fuel injection θ, the detected engine speed NE and the numerical map according to FIG. 3, in step 206.

Then, the concentration of oxygen in the exhaust path C is detected by the oxygen concentration sensor 24 shown in FIG. 1, in step 208. Since the concentration of oxygen in the exhaust path C being the output value from the oxygen concentration sensor 24 directly corresponds to an actual air ratio λ (an air-fuel ratio of the engine), the actual air ratio λ is calculated on the basis of the concentration of oxygen in the exhaust path C, in step 210. Then, the concentration of oxygen in the intake path x is detected by the oxygen concentration sensor 22 shown in FIG. 1, in step 212. As explained below, a converted actual EGR ratio being a ratio of an actual EGR ratio to the actual air ratio, is calculated on the basis of the concentration of oxygen in the intake path x, in step 214.

Figure 5:
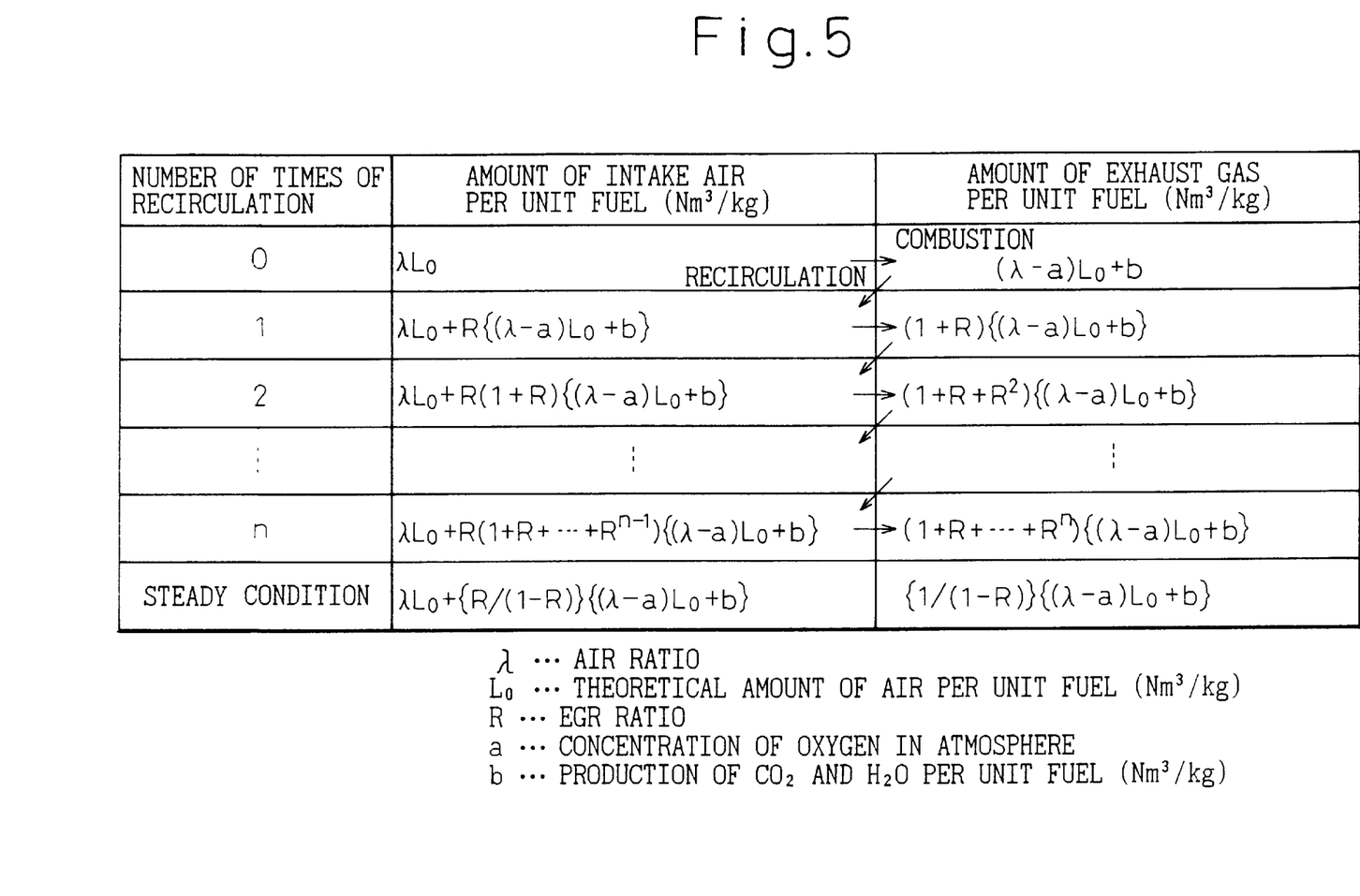
FIG. 5 is a table showing formulas of the amount of the intake air per unit fuel and the amount of the exhaust gas per unit fuel during each recirculation.
Figure 6:
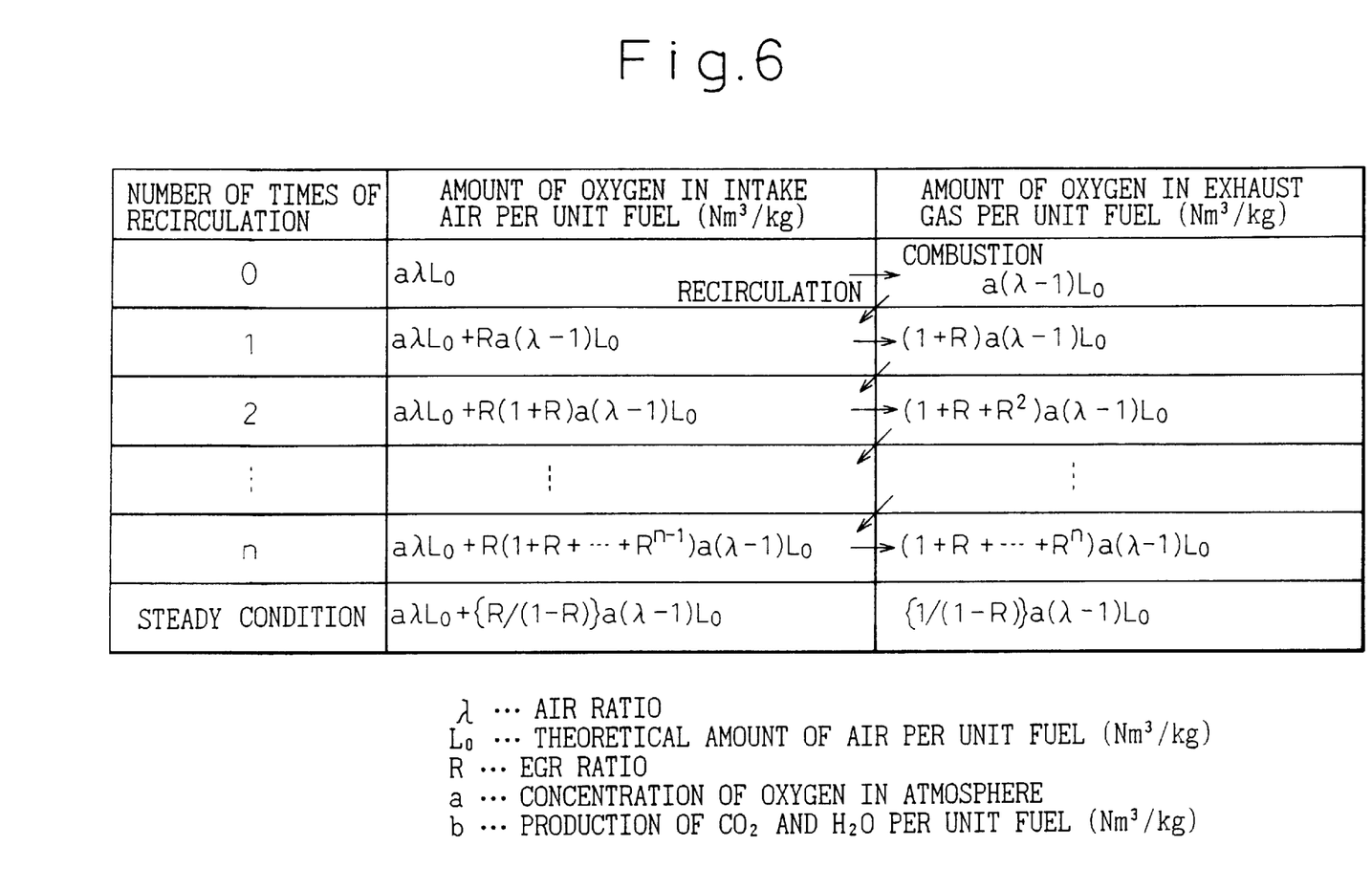
FIG. 6 is a table showing formulas of the amount of oxygen in the intake air per unit fuel and the amount of oxygen in the exhaust gas per unit fuel during each recirculation.

FIGS. 5 and 6 show how the converted actual EGR ratio is calculated on the basis of the concentration of oxygen in the intake path x. FIGS. 5 and 6 show the amount of the intake air and the amount of oxygen in the intake air by means of the actual EGR ratio R and the air ratio λ etc., after a recirculation is sufficiently achieved, i.e., after the EGR gas is sufficiently recirculated to the intake path via the EGR path. FIG. 5 respectively shows the amount of the intake air per unit fuel ($Nm^3/kg$) and the amount of the exhaust gas per unit fuel ($Nm^3/kg$) when the number of times of recirculation is 0, 1, 2 and n, and during the steady condition, i.e., when the number of times of recirculation is ∞. In FIG. 5, $\lambda$ shows the air ratio, $L_0$ shows the theoretical amount of air per unit fuel, i.e., the amount of air containing the required amount of oxygen for completely combusting the fuel of 1 kg, R shows the actual EGR ratio, a shows a concentration of oxygen in an atmosphere, and b shows a production of $CO_2$ and $H_2O$ per unit fuel ($Nm^3/kg$).

When the number of times of recirculation is 0, the amount of the intake air per unit is $\lambda L_0$, $\lambda L_0$ being equal to the amount of the air per unit fuel introduced from the atmosphere. The amount of the exhaust gas per unit fuel is $(\lambda-a)L_0+b(=(\lambda-1)L_0+(1-a)L_0+b)$, wherein $(\lambda-1)L_0$ is the amount of air which is not used during the combustion, $(1-a)L_0$ is the amount of components except oxygen contained in the remaining air, the amount of the remaining air being $L_0$, and b is the amount of $CO_2$ and $H_2O$ produced during the combustion. Then a part of the exhaust gas is recirculated to the intake path 12 via the EGR path 16 (FIG. 1), the ratio of the part of the exhaust gas to the exhaust gas being the EGR ratio. Then, when the number of times of recirculation is 1, the amount of the intake air per unit fuel is $\lambda L_0+R((\lambda-a)L_0+b)$, wherein $\lambda L_0$ is the amount of air newly introduced from the atmosphere, and $R((\lambda-a)L_0+b)$ is the amount of the EGR gas. The amount of the exhaust gas per unit fuel after the combustion is $(1+R)((\lambda-a)L_0+b)$. Then, when the number of times of recirculation is 2, the amount of the intake air per unit fuel is $\lambda L_0+R(1+R)((\lambda-a)L_0+b)$, and the amount of the exhaust gas per unit fuel after the combustion is $(1+R+R^2)((\lambda-a)L_0+b)$. Then, when the number of times of recirculation is n, the amount of the intake air per unit fuel is $\lambda L_0+R(1+R+\ldots+R^{n-1})((\lambda-a)L_0+b)$, and the amount of the exhaust gas per unit fuel after the combustion is $(1+R+\ldots+R^n)((\lambda-a)L_0+b)$. Then, during the steady condition, i.e., when the number of times of recirculation is ∞, the amount of the intake air per unit fuel is $\lambda L_0+(R/(1-R))((\lambda-a)L_0+b)$, and the amount of the exhaust gas per unit fuel after the combustion is $(1/(1-R))((\lambda-a)L_0+b)$.

FIG. 6 respectively shows the amount of oxygen in the intake air per unit fuel ($Nm^3/kg$) and the amount of oxygen in the exhaust gas per unit fuel ($Nm^3/kg$) when the number of times of recirculation is 0, 1, 2 and n, and during the steady condition, i.e., when the number of times of recirculation is ∞. In FIG. 6 as well as FIG. 5, $\lambda$ shows the air ratio, $L_0$ shows the theoretical amount of air per unit fuel, i.e., the amount of air containing the required amount of oxygen for completely combusting the fuel of 1 kg, R shows the actual EGR ratio, a shows a concentration of oxygen in an atmosphere, and b shows a production of $CO_2$ and $H_2O$ per unit fuel ($Nm^3/kg$).

When the number of times of recirculation is 0, the amount of oxygen in the intake air per unit is $a\lambda L_0$, wherein $\lambda L_0$ is the amount of the air per unit fuel introduced from the atmosphere. The amount of oxygen in the exhaust gas per unit fuel is $a(\lambda-1)L_0$, wherein $(\lambda-1)L_0$ is the amount of air which is not used during the combustion. Then a part of the exhaust gas is recirculated to the intake path 12 via the EGR path 16 (FIG. 1), wherein the amount of the exhaust gas per unit fuel is $(\lambda-a)L_0+b$, and the ratio of the part of the exhaust gas to the exhaust gas is the EGR ratio. Then, when the number of times of recirculation is 1, the amount of oxygen in the intake air per unit fuel is $a\lambda L_0+Ra(\lambda-1)L_0$, wherein $a\lambda L_0$ is the amount of oxygen in air newly introduced from the atmosphere, and $Ra(\lambda-1)L_0$ is the amount of oxygen in the EGR gas. The amount of oxygen in the exhaust gas per unit fuel after the combustion is $(1+R)a(\lambda-1)L_0$. Then, when the number of times of recirculation is 2, the amount of oxygen in the intake air per unit fuel is $a\lambda L_0+R(1+R)a(\lambda-1)L_0$, and the amount of oxygen in the exhaust gas per unit fuel after the combustion is $(1+R+R^2)a(\lambda-1)L_0$. Then, when the number of times of recirculation is n, the amount of oxygen in the intake air per unit fuel is $a\lambda L_0+R(1+R+\ldots+R^{n-1})a(\lambda-1)L_0$, and the amount of oxygen in the exhaust gas per unit fuel after the combustion is $(1+R+\ldots+R^n)a(\lambda-1)L_0$. Then, during the steady condition, i.e., when the number of times of recirculation is ∞, the amount of oxygen in the intake air per unit fuel is $a\lambda L_0+(R/(1-R))a(\lambda-1)L_0$, and the amount of oxygen in the exhaust gas per unit fuel after the combustion is $(1/(1-R))a(\lambda-1)L_0$.

The following relational expression (1) is calculated on the basis of the amount of the intake air per unit fuel in FIG. 5, the amount of oxygen in the intake air per unit fuel in FIG. 6 and the concentration of oxygen in the intake path, which is detected by the oxygen concentration sensor 22 (FIG. 1):

$$x = \frac{a\lambda L_0 + (R/(1-R))a(\lambda-1)L_0}{\lambda L_0 + (R/(1-R))((\lambda-a)L_0+b)} \qquad (1)$$

wherein x is the concentration of oxygen in the intake path, $a\lambda L_0+(R/(1-R))a(\lambda-1)L_0$ is the amount of oxygen in the intake air per unit fuel, and $\lambda L_0+(R/(1-R))((\lambda-a)L_0+b)$ is the amount of the intake air per unit fuel.

The following relational expression (2) which is expressed by the converted actual EGR ratio $R/\lambda$ and the concentration of oxygen in the intake path x, is converted from the relational expression (1).

$$R/\lambda = \frac{(a-x)L_0}{aL_0 + (b-aL_0)x} \qquad (2)$$

Figure 7:
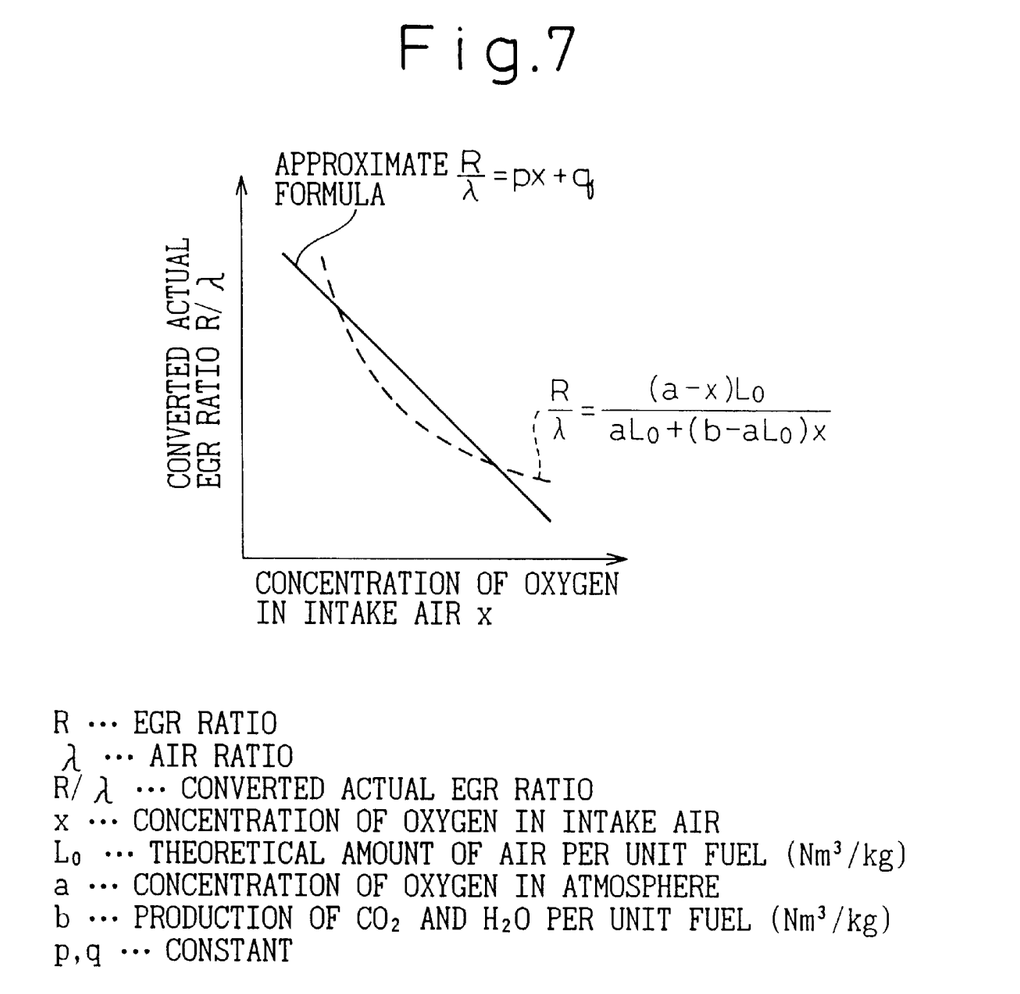
FIG. 7 is a graph showing the relation between the concentration of oxygen in the intake air and the converted actual EGR ratio.

Again, as shown in FIG. 4, the converted actual EGR ratio is calculated on the basis of the relational expression (2) and the concentration of oxygen in the intake path x, which is detected by the oxygen concentration sensor 22 (FIG. 1), in step 214. During the step 214, instead of using the relational expression (2) which shows a hyperbolic curve, it is possible to use an approximated straight line as shown in FIG. 7, FIG. 7 being a graph showing the relation between the concentration of oxygen in the intake air and the converted actual EGR ratio. The approximated straight line is shown by means of the following relational expression (3):

$$R/\lambda = px+q \qquad (3)$$

wherein p and q are constant.

Then, as shown in FIG. 4, in step 216, the actual EGR ratio is calculated on the basis of the actual air ratio calculated in the step 210 and the converted actual EGR ratio calculated in the step 214.

Then, in step 218, the failure of the EGR apparatus is judged by the diagnosis 32 (FIG. 1), wherein a predetermined failure criterion value, and an absolute value of the difference between the actual EGR ratio and the target EGR ratio are compared. When the absolute value is larger than the failure criterion value, the EGR apparatus is judged to have failed, the ECU indicates the failure caution of the EGR apparatus by means of the diagnosis 32, in step 220. When the absolute value is equal to or less than the failure criterion value, the EGR apparatus is not judged to have failed.

Then, the target EGR ratio calculated in the step 206 and the actual EGR ratio calculated in the step 216 are compared in step 222. When the target EGR ratio and the actual EGR ratio are the same, the EGR control valve 18 (FIG. 1) is not driven, the divergence of the EGR control valve 18 being maintained. When the target EGR ratio and the actual EGR ratio are not the same, the EGR control valve 18 is driven, the divergence of the EGR control valve 18 being adjusted in order to put the actual EGR ratio close to the target EGR ratio, in step 224. In particular, when the actual EGR ratio is larger than the target EGR ratio, the divergence of the EGR control valve 18 is decreased. When the actual EGR ratio is smaller than the target EGR ratio, the divergence of the EGR control valve 18 is increased.

Then, in step 226, the program is returned to the step 200, and until the operation of the engine is stopped, the above steps are repeated.

A second embodiment of a combustion engine with an EGR apparatus according to the present invention will be explained below, wherein components of the second embodiment are the same as the components of the first embodiment except that the oxygen concentration sensor 24 (FIG. 1) is eliminated in the second embodiment.

Referring to FIG. 1, a voltage signal corresponding to an accelerator divergence (the amount of displacement of an accelerator pedal) detected by an accelerator divergence sensor 26 mounted near the accelerator pedal, and a voltage signal corresponding to a concentration of oxygen in an intake path detected by an oxygen concentration sensor 22 mounted in the intake path 12, are respectively received by means of an input port of an ECU 30 via an AD convertor containing a multiplexer. Each analogue voltage signal from each sensor is converted to a digital signal at intervals by means of the ECU 30, and is stored in a RAM of the ECU 30. Further, a pulse signal showing an engine speed and sent from an engine speed sensor 28 which is mounted on a crank shaft (not shown) of the engine 10, is received at intervals by means of the input port of the ECU 30. The engine speed is calculated by a CPU on the basis of the pulse signal, and is stored in the RAM of the ECU 30. Data corresponding to the concentration of oxygen in the intake path, the accelerator divergence and the engine speed, and stored in the RAM are renewed at intervals, therefore, the RAM always has the latest data.

Figure 8:
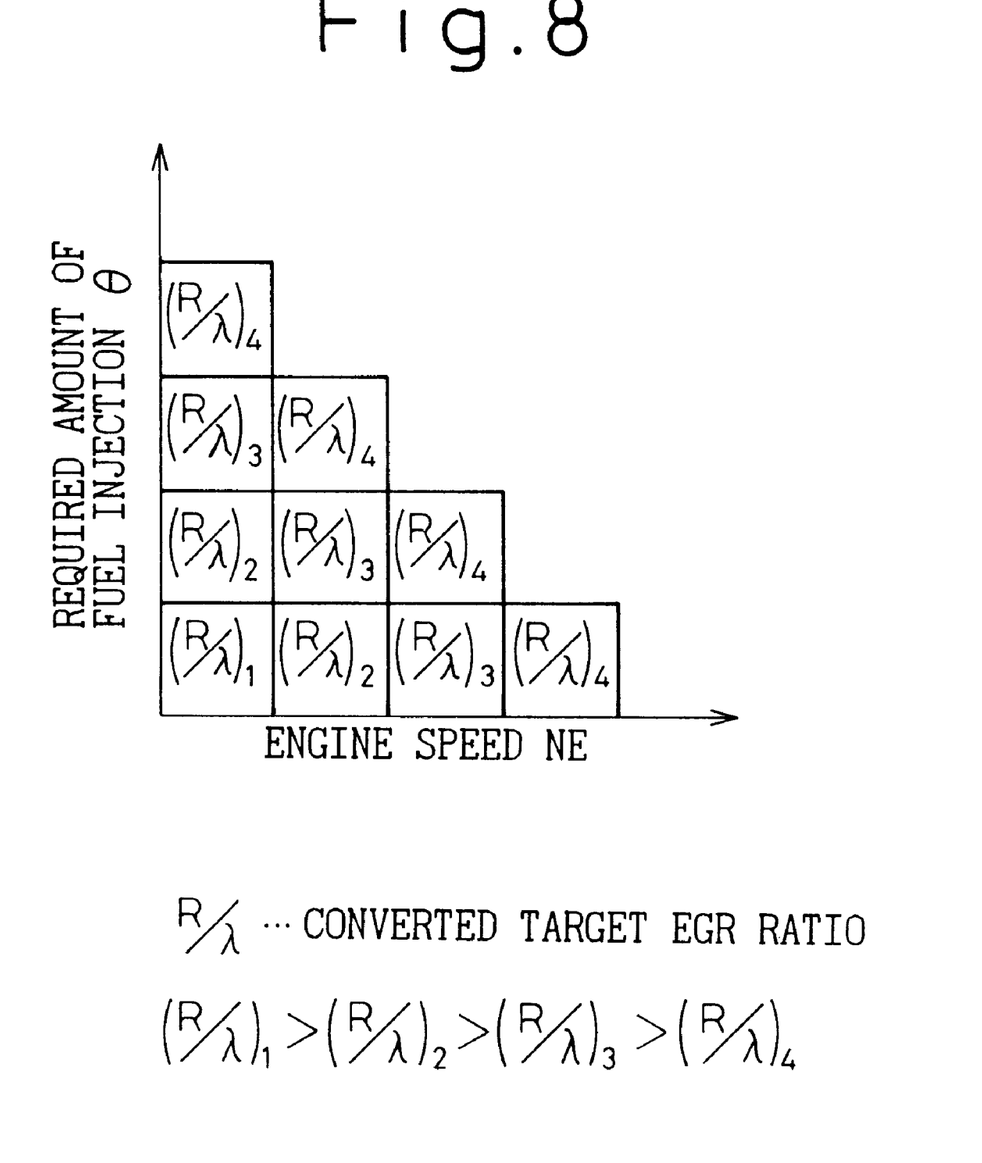
FIG. 8 is a map for calculating the converted target EGR ratio on the basis of the detected engine speed and the required amount of fuel injection.

In the second embodiment, instead of the target EGR ratio of the first embodiment, a converted target EGR ratio is calculated on the basis of the required amount of fuel injection Q and the engine speed NE, the converted target EGR ratio being a ratio of a target EGR ratio to an actual air ratio. FIG. 8 shows a map for calculating the converted target EGR ratio on the basis of the engine speed NE and the required amount of fuel injection Q. In FIG. 8, a vertical axis shows the required amount of fuel injection Q, a cross axis shows the engine speed NE, each value of $(R/\lambda)_1$, $(R/\lambda)_2$, $(R/\lambda)_3$ and $(R/\lambda)_4$ shows a predetermined converted target EGR ratio wherein $(R/\lambda)_1$ is larger than $(R/\lambda)_2$, $(R/\lambda)_2$ is larger than $(R/\lambda)_3$, and $(R/\lambda)_3$ is larger than $(R/\lambda)_4$. Each value of the converted target EGR ratio in FIG. 8 is stored in the ROM of the ECU 30 in the form of a numerical map on the basis of the required amount of fuel injection θ and the engine speed NE. The ECU 30 calculates the converted target EGR ratio on the basis of the detected required amount of fuel injection θ, the detected engine speed NE and the numerical map according to FIG. 8.

Figure 9:
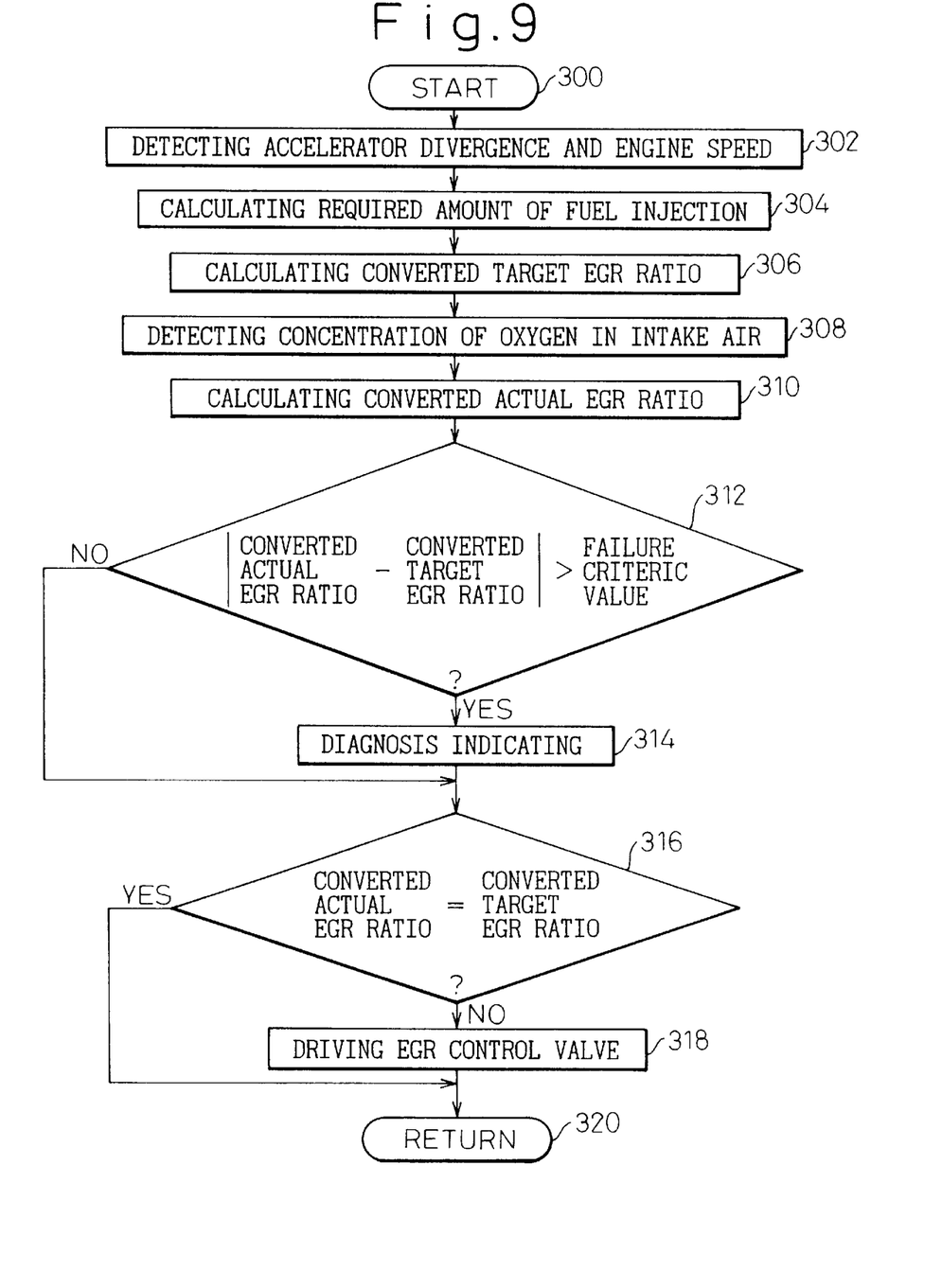
FIG. 9 is a control flow chart of the EGR apparatus of a second embodiment of the combustion engine with the EGR apparatus according to the present invention.

FIG. 9 shows a control flow chart for the EGR apparatus of the second embodiment of the combustion engine with the EGR apparatus according to the present invention. As shown in FIG. 9, after control of the EGR apparatus is started in step 300, the accelerator divergence θ and the engine speed NE are detected by the accelerator divergence sensor 26 and the engine speed sensor 28 shown in FIG. 1, in step 302. Then, the required amount of fuel injection Q is calculated on the basis of the detected accelerator divergence θ, the detected engine speed NE and the numerical map according to FIG. 2, in step 304. Then, the converted target EGR ratio is calculated on the basis of the detected required amount of fuel injection θ, the detected engine speed NE and the numerical map according to FIG. 8, in step 306.

Then, the concentration of oxygen in the intake path x is detected by the oxygen concentration sensor 22 shown in FIG. 1, in step 308. As explained above referring to FIGS. 5 to 7, a converted actual EGR ratio being a ratio of an actual EGR ratio to the actual air ratio, is calculated on the basis of the concentration of oxygen in the intake path x, in step 310.

Then, in step 312, a failure of the EGR apparatus is judged by the diagnosis 32 (FIG. 1), wherein a predetermined failure criterion value, and an absolute value of the difference between the converted actual EGR ratio and the converted target EGR ratio are compared. When the absolute value is larger than the failure criterion value, the EGR apparatus is judged to have failed, the ECU indicates the failure caution of the EGR apparatus by means of the diagnosis 32, in step 314. When the absolute value is equal to or less than the failure criterion value, the EGR apparatus is not judged to have failed.

Then, the converted target EGR ratio calculated in step 306 and the converted actual EGR ratio calculated in step 310 are compared in step 316. When the converted target EGR ratio and the converted actual EGR ratio are the same, the EGR control valve 18 (FIG. 1) is not driven, the divergence of the EGR control valve 18 is maintained. When the converted target EGR ratio and the converted actual EGR ratio are not the same, the EGR control valve 18 is driven, the divergence of the EGR control valve 18 being adjusted in order to put the converted actual EGR ratio close to the converted target EGR ratio, in step 318. In particular, when the converted actual EGR ratio is larger than the converted target EGR ratio, the divergence of the EGR control valve 18 is decreased. When the converted actual EGR ratio is smaller than the converted target EGR ratio, the divergence of the EGR control valve 18 is increased.

Then, in step 320, the program is returned to the step 300, and until the operation of the engine is stopped, the above steps are repeated.

While the above description constitutes the preferred embodiment of the present invention, it will be appreciated that the invention is susceptible to modification, variation and change without departing from the proper scope and fair meaning of the accompanying claims.

What is claimed is:

1. A combustion engine with an EGR apparatus having an EGR path connecting an exhaust path and an intake path, an EGR control valve mounted in the EGR path for controlling an amount of flow of an EGR gas from the exhaust path to the intake path, and a joint between the intake path and the EGR path, the combustion engine comprising:

detecting means mounted in the intake path downstream of the joint for detecting a concentration of oxygen in an intake air, the intake air containing the EGR gas and an atmospheric air introduced from an atmosphere via the intake path; and means for calculating a converted actual EGR ratio on the basis of the concentration of oxygen in the intake air, wherein the converted actual EGR ratio is a ratio of an actual EGR ratio to an actual air-fuel ratio of air entering a combustion chamber of the engine and the actual EGR ratio is a ratio of the amount of the EGR gas to an amount of the intake air.

2. A combustion engine according to claim 1, wherein the converted actual EGR ratio calculating means calculates the converted actual EGR ratio on the basis of an equation of state and the concentration of oxygen in the intake air, the equation of state being based on a state of the intake air containing the EGR gas.

3. A combustion engine according to claim 1, wherein the converted actual EGR ratio calculating means calculates the converted actual EGR ratio on the basis of the following formula:

$$(R/\lambda)=((a-x)L_0)/(aL_0+(b-aL_0)x);$$

$R/\lambda$: the converted actual EGR ratio;

a: a concentration of oxygen in the atmosphere;

x: the concentration of oxygen in the intake air;

$L_0$: theoretical amount of air required for the combustion of an unit fuel; and b: a production of $CO_2$ and $H_2O$ produced during the combustion of the unit fuel.

4. A combustion engine according to claim 1, wherein the converted actual EGR ratio calculating means calculates the converted actual EGR ratio on the basis of the concentration of oxygen in the intake air and wherein the converted actual EGR ratio decreases when the concentration of oxygen in the intake air increases.

5. A combustion engine according to claim 1, further comprising:

operational condition detecting means for detecting an operational condition of the combustion engine;

target EGR ratio calculating means for calculating a target EGR ratio corresponding to the operational condition detected by the operational condition detecting means;

actual air-fuel ratio detecting means for detecting the actual air-fuel ratio of the combustion engine;

actual EGR ratio calculating means for calculating the actual EGR ratio on the basis of the converted actual EGR ratio and the actual air-fuel ratio; and EGR ratio controlling means for controlling the EGR control valve to make the actual EGR ratio approach the target EGR ratio.

6. A combustion engine according to claim 5, comprising:

an EGR ratio difference calculating means for calculating a difference between the actual EGR ratio and the target EGR ratio; and failure judging means for judging the EGR apparatus to have failed when the difference is larger than a failure criterion value.

7. A combustion engine according to claim 5, wherein the EGR ratio controlling means practices a feedback control of the divergence of the EGR control valve on the basis of the actual EGR ratio and the target EGR ratio.

8. A combustion engine according to claim 1, further comprising:

operational condition detecting means for detecting an operational condition of the combustion engine;

converted target EGR ratio calculating means for calculating a converted target EGR ratio corresponding to the operational condition detected by the operational condition detecting means, the converted target EGR ratio being a ratio of a target EGR ratio to an actual air-fuel ratio; and converted EGR ratio controlling means for controlling the EGR control valve to make the converted actual EGR ratio approach the converted target EGR ratio.

9. A combustion engine according to claim 8, comprising:

a converted EGR ratio difference calculating means for calculating a difference between the converted actual EGR ratio and the converted target EGR ratio; and failure judging means for judging the EGR apparatus to have failed when the difference is larger than a failure criterion value.

10. A combustion engine according to claim 8, wherein the converted EGR ratio controlling means practices a feedback control of the EGR control valve on the basis of the converted actual EGR ratio and the converted target EGR ratio to make the converted actual EGR ratio approach the converted target EGR ratio.

* * * * *